United States Patent
Hu et al.

(10) Patent No.: US 12,410,099 B1
(45) Date of Patent: Sep. 9, 2025

(54) LIGHTWEIGHT AGGREGATE-BASED NON-STEAM-CURED HIGH-PERFORMANCE PIPE CULVERT AND PREPARATION METHOD THEREOF

(71) Applicants: SHANDONG UNIVERSITY, Jinan (CN); KUNMING SHUNHONG NEW MATERIALS CO., LTD, Kunming (CN)

(72) Inventors: Zhijuan Hu, Jinan (CN); Zesheng Wang, Kunming (CN); Wenlong Wang, Jinan (CN); Jingwei Li, Jinan (CN); Xujiang Wang, Jinan (CN); Shizhao Yang, Jinan (CN); Yujie Li, Kunming (CN); Xiangkun Zhang, Jinan (CN)

(73) Assignees: SHANDONG UNIVERSITY, Jinan (CN); KUNMING SHUNHONG NEW MATERIALS CO., LTD, Kunming (CN)

( * ) Notice: Subject to any disclaimer, the term of this patent is extended or adjusted under 35 U.S.C. 154(b) by 0 days.

(21) Appl. No.: 19/202,064

(22) Filed: May 8, 2025

(30) Foreign Application Priority Data

Mar. 10, 2025 (CN) .......................... 202510274057.9

(51) Int. Cl.
| | | |
|---|---|---|
| *C04B 28/06* | (2006.01) | |
| *B28B 13/02* | (2006.01) | |
| *B28B 21/04* | (2006.01) | |
| *B28B 21/76* | (2006.01) | |
| *C04B 14/36* | (2006.01) | |
| *C04B 18/02* | (2006.01) | |
| *C04B 22/00* | (2006.01) | |
| *C04B 24/26* | (2006.01) | |
| *C04B 40/00* | (2006.01) | |
| *C04B 40/02* | (2006.01) | |
| *C04B 103/20* | (2006.01) | |
| *C04B 103/30* | (2006.01) | |
| *E01F 5/00* | (2006.01) | |
| *E02B 11/00* | (2006.01) | |

(52) U.S. Cl.
CPC ............ *C04B 28/065* (2013.01); *B28B 13/02* (2013.01); *B28B 21/04* (2013.01); *B28B 21/76* (2013.01); *C04B 14/365* (2013.01); *C04B 18/027* (2013.01); *C04B 22/0013* (2013.01); *C04B 24/2647* (2013.01); *C04B 40/0046* (2013.01); *C04B 40/0277* (2013.01); *E01F 5/005* (2013.01); *E02B 11/005* (2013.01); *C04B 2103/20* (2013.01); *C04B 2103/302* (2013.01); *C04B 2201/20* (2013.01); *C04B 2201/50* (2013.01)

(58) Field of Classification Search
CPC ......... B28B 13/02; B28B 21/04; B28B 21/76; C04B 28/065; C04B 14/365; C04B 18/027; C04B 22/0013; C04B 24/264; C04B 40/0046; C04B 40/0277; C04B 2103/20; C04B 2103/302; C04B 2201/20; C04B 2201/50; E01F 5/005; E02B 11/005
See application file for complete search history.

(56) References Cited

FOREIGN PATENT DOCUMENTS

| CN | 109020418 A | * | 12/2018 | ............... C04B 7/32 |
|---|---|---|---|---|
| CN | 115093184 A | * | 9/2022 | ............ C04B 28/06 |
| CN | 117142828 A | * | 12/2023 | ............ C04B 28/06 |
| CN | 118005358 A | * | 5/2024 | ............ C04B 20/04 |
| CN | 118993594 A | * | 11/2024 | ........... C04B 14/185 |
| CN | 119371225 A | * | 1/2025 | ............ C04B 28/06 |

* cited by examiner

*Primary Examiner* — Anthony J Green
(74) *Attorney, Agent, or Firm* — IPro, PLLC; Na Xu

(57) ABSTRACT

A lightweight aggregate-based non-steam-cured high-performance pipe culvert and a preparation method thereof. The lightweight aggregate-based non-steam-cured high-performance pipe culvert is prepared from a raw material including the following components by mass per unit volume: 300-450 kg/m$^3$ of a low-carbon sulfur-aluminum-ferric cementitious material; 800-920 kg/m$^3$ of a solid waste-based lightweight aggregate; 300-550 kg/m$^3$ of a solid waste-based artificial sand; 0-100 kg/m$^3$ of a mineral admixture; 0-50 kg/m$^3$ of an auxiliary material; and 110-160 kg/m$^3$ of water; and the lightweight aggregate-based non-steam-cured high-performance pipe culvert further includes a water reducer and a retarder. The lightweight aggregate-based non-steam-cured high-performance pipe culvert of the present invention can be demolded within 4 hours during forming, with short demolding time and no need for steam curing, resulting in a low production cost and high production efficiency. The obtained product has high strength, good impermeability and durability, and can utilize solid waste in a high proportion.

17 Claims, No Drawings

LIGHTWEIGHT AGGREGATE-BASED NON-STEAM-CURED HIGH-PERFORMANCE PIPE CULVERT AND PREPARATION METHOD THEREOF

CROSS-REFERENCE TO RELATED APPLICATIONS

The present invention claims priority to Chinese Patent Application No. 202510274057.9, filed with the China National Intellectual Property Administration on Mar. 10, 2025, entitled "LIGHTWEIGHT AGGREGATE-BASED NON-STEAM-CURED HIGH-PERFORMANCE PIPE CULVERT AND PREPARATION METHOD THEREOF", the entire contents of which are incorporated herein by reference and constitute part of the present invention for all purposes.

TECHNICAL FIELD

The present invention relates to the technical field of concrete pipe culverts, and in particular, to a lightweight aggregate-based non-steam-cured high-performance pipe culvert and a preparation method thereof.

BACKGROUND

The information disclosed in the background art of the present invention is merely intended to enhance the understanding of the general background of the present invention, and is not necessarily to be construed as an admission or any form of implication that such information constitutes the prior art already known to those of ordinary skill in the art.

Concrete pipe culverts are a kind of pipeline component made of concrete, which are widely used in fields such as water conservancy and transportation. It has relatively strong structural strength and durability, and is one of the important structural forms in modern engineering construction. According to different shapes and purposes of use, concrete pipe culverts can be divided into various types such as circular, rectangular, and trough-shaped. According to the purposes of use, they can be divided into drainage pipe culverts, passage pipe culverts, tunnel pipe culverts, etc. At present, the conventional method for preparing concrete pipe culverts is to use ordinary Portland cement and sand and gravel aggregates to make concrete for pouring. Its advantage is that the technology is relatively mature, and there are various specifications to guide the processing and manufacturing. However, the existing process for preparing concrete pipe culverts has the following problems: on the one hand, its demolding time is long, usually over 12 h, resulting in relatively low production efficiency; on the other hand, it requires steam curing, which consumes a large amount of energy. Moreover, taking Portland cement as the main cementitious material, the proportion of Portland cement is high, so the cost and carbon emissions are relatively high. Besides, sand and gravel aggregates need to be obtained by mining natural mines, which is not conducive to the protection of the ecological environment and increases the transportation cost.

Therefore, it is necessary to provide a high-performance pipe culvert that is non-steam-cured, with short demolding time, light weight, high strength and a high utilization rate of solid waste and a preparation method thereof.

SUMMARY

In view of the above, the present invention provides a lightweight aggregate-based non-steam-cured high-performance pipe culvert and a preparation method thereof. The non-steam-cured high-performance pipe culvert of the present invention has a relatively high utilization proportion of solid waste, good construction performance and short demolding time, does not require steam curing, and has high product strength and a short production cycle.

In a first aspect, the present invention provides a lightweight aggregate-based non-steam-cured high-performance pipe culvert, where the lightweight aggregate-based non-steam-cured high-performance pipe culvert is prepared from a raw material including the following components by mass per unit volume of lightweight aggregate concrete:

300-450 kg/m$^3$ of a low-carbon sulfur-aluminum-ferric cementitious material;
800-920 kg/m$^3$ of a solid waste-based lightweight aggregate;
300-550 kg/m$^3$ of a solid waste-based artificial sand;
0-100 kg/m$^3$ of a mineral admixture;
0-50 kg/m$^3$ of an auxiliary material;
110-160 kg/m$^3$ of water;
the raw material further includes a water reducer and a retarder, the water reducer being added in an amount of 1.5-5 wt % of the low-carbon sulfur-aluminum-ferric cementitious material, and the retarder being added in an amount of 0.1-0.5 wt % of the low-carbon sulfur-aluminum-ferric cementitious material; and
the solid waste-based lightweight aggregate and the solid waste-based artificial sand are respectively prepared from the following components in percentage by mass: 10-20% of the low-carbon sulfur-aluminum-ferric cementitious material, 0-90% of phosphogypsum or desulfurized gypsum, and 0-90% of fly ash or gold tailings.

As used herein, the term "non-steam-cured" or "non-steam-curing" refers to curing processes that do not utilize steam as an accelerated curing method. This includes, but is not limited to, ambient temperature curing, standard curing, moist curing, or natural curing under environmental conditions without the application of steam. For example, in some embodiments of the present invention, the concrete culvert is naturally cured at ambient temperature (such as at 25±3° C.) without using steam, wherein after demolding, water is sprayed and the pipe culvert is covered with plastic film for curing, such as for 1-3 days.

In a second aspect, the present invention provides a method for preparing the above lightweight aggregate-based non-steam-cured high-performance pipe culvert, including steps of:

pre-wetting a solid waste-based lightweight aggregate and solid waste-based artificial sand by adding water separately to obtain a saturated surface dry solid waste-based lightweight aggregate and a saturated surface dry solid waste-based artificial sand;

mixing a low-carbon sulfur-aluminum-ferric cementitious material, a mineral admixture and an auxiliary material uniformly by stirring, then adding the saturated surface dry solid waste-based lightweight aggregate and the saturated surface dry solid waste-based artificial sand, water, a retarder and a water reducer, stirring, then pouring into a pipe culvert forming mold system for pipe culvert forming, allowing to stand naturally, demolding within 4 hours, spraying with water, and then covering with a plastic film and curing for 1-3 days.

Compared with the prior art, the present invention has achieved the following beneficial effects:

the lightweight aggregate-based non-steam-cured high-performance pipe culvert provided by the present invention adopts the low-carbon sulfur-aluminum-ferric cementitious material as the main cementitious material, which has characteristics of early strength, rapid setting and high strength. Meanwhile, the raw materials for preparing both the solid waste-based lightweight aggregate and the solid waste-based artificial sand contain low-carbon sulfur-aluminum-ferric cementitious materials. When preparing the lightweight aggregate concrete pipe culvert, the hydration products of the cementitious material are similar to those of the lightweight aggregate and the lightweight aggregate sand. Therefore, the hydration products of the cementitious material can penetrate into the micropores of the lightweight aggregate, resulting in a tight bond between the lightweight aggregate and the lightweight aggregate sand with the cementitious material, a dense interfacial transition zone, high overall strength, and better impermeability and durability. The proportion of solid waste in both the solid waste-based lightweight aggregate and the solid waste-based artificial sand can reach over 80%. The compressive strength of the lightweight aggregate-based non-steam-cured high-performance pipe culvert of the present invention can exceed 25 M Pa within 4 h after pouring, and the 28-d compressive strength can reach over 40 M Pa. Moreover, it can utilize solid waste in a high proportion. In the process for preparing the pipe culvert, the pipe culvert has good construction performance and short demolding time. The demolding time is more than 75% shorter than that of conventional pipe culverts. The pipe culvert does not require steam curing and has low energy consumption, and the products can be delivered from the factory quickly, with the remarkable characteristics of a low production cost and high production efficiency. The obtained pipe culvert has a cracking load greater than 75 kN/m, a failure load greater than 110 kN/m, and an internal water pressure greater than 0.10 M Pa.

DETAILED DESCRIPTION

It should be noted that the following detailed description is exemplary and is intended to provide further explanation of the present invention. Unless otherwise specified, all technical and scientific terms used herein have the same meanings as commonly understood by those of ordinary skill in the art to which the present invention pertains.

The present invention provides a lightweight aggregate-based non-steam-cured high-performance pipe culvert, where the lightweight aggregate-based non-steam-cured high-performance pipe culvert is prepared from a raw material including the following components by mass per unit volume of lightweight aggregate concrete:

300-450 kg/m$^3$ of a low-carbon sulfur-aluminum-ferric cementitious material;
800-920 kg/m$^3$ of a solid waste-based lightweight aggregate;
300-550 kg/m$^3$ of solid waste-based artificial sand;
0-100 kg/m$^3$ of a mineral admixture;
0-50 kg/m$^3$ of an auxiliary material;
110-160 kg/m$^3$ of water;
the lightweight aggregate-based non-steam-cured high-performance pipe culvert further includes a water reducer and a retarder, where an addition amount of the water reducer is 1.5-5 wt % of the low-carbon sulfur-aluminum-ferric cementitious material, and an addition amount of the retarder is 0.1-0.5 wt % of the low-carbon sulfur-aluminum-ferric cementitious material;

the solid waste-based lightweight aggregate and the solid waste-based artificial sand are prepared from the following components in percentage by mass: 10-20% of a low-carbon sulfur-aluminum-ferric cementitious material, 0-90% of phosphogypsum or desulfurized gypsum, and 0-90% of fly ash or gold tailings.

The present invention uses the low-carbon sulfur-aluminum-ferric cementitious material as the main cementitious material for the pipe culvert, which has characteristics of early strength, rapid setting and high strength. Meanwhile, the raw material of the pipe culvert in the present invention also includes the solid waste-based lightweight aggregate and the solid waste-based artificial sand, which also use the low-carbon sulfur-aluminum-ferric cementitious material as the cementitious material. Therefore, the hydration products of the cementitious material and the aggregate in the pipe culvert of the present invention have similar mineral phases, and the hydration products can penetrate into the micropores of the lightweight aggregate, resulting in a smooth interfacial transition zone between the two, with a tight bond and high strength. The 28-d compressive strength can reach over 40 M Pa. The overall pipe culvert is dense, with strong resistance to sulfate dry-wet cycles and corrosion. In addition, the use proportion of solid waste such as phosphogypsum in the solid waste-based lightweight aggregate and the solid waste-based artificial sand is as high as over 80%, which can significantly reduce costs and simultaneously consume a large amount of difficult-to-treat solid waste. Through the synergistic cooperation of multiple components such as the low-carbon sulfur-aluminum-ferric cementitious material, the solid waste-based lightweight aggregate, and the solid waste-based artificial sand, the process for preparing the pipe culvert of the present invention has characteristics of short demolding time, no need for steam curing, a low production cost, high production efficiency, etc. The obtained pipe culvert has high strength and very good application prospects.

In the present invention, in the low-carbon sulfur-aluminum-ferric cementitious material, $CaO \geq 37\%$, $Al_2O_3 \geq 20\%$, $Fe_2O_3 \geq 6\%$, and $SO_3 \geq 8\%$. The present invention does not impose any special restrictions on the method for preparing the low-carbon sulfur-aluminum-ferric cementitious material, as long as it meets the standard "Low-carbon sulfur-aluminum-ferric cementitious materials" (T/CCPA 42-2023).

In the present invention, the solid waste-based lightweight aggregate has a bulk density of less than 1200 kg/m$^3$, a particle size of 5-20 mm, an apparent density of 1600-1800 kg/m$^3$, a cylinder compressive strength greater than 6 M Pa, and a softening coefficient greater than 0.82. The solid waste-based lightweight aggregate of the present invention has the characteristics of light weight and high strength. Due to its relatively high use proportion, it can effectively reduce the total weight of the materials.

In the solid waste-based lightweight aggregate of the present invention, a mass per unit lightweight aggregate concrete volume of a solid waste-based lightweight aggregate with a particle size of 5-10 mm is 240-280 kg/m$^3$, and a mass per unit lightweight aggregate concrete volume of a solid waste-based lightweight aggregate with a particle size of 10-20 mm is 560-640 kg/m$^3$.

In the present invention, the solid waste-based artificial sand has a bulk density of less than 1200 kg/m$^3$, a particle size of 0.15-4.75 mm, a fineness modulus of 2.4-3.0, and a cylinder compressive strength greater than 6 M Pa.

In the present invention, a method for preparing the solid waste-based lightweight aggregate is as follows: mixing and stirring a low-carbon sulfur-aluminum-ferric cementitious material with phosphogypsum or desulfurized gypsum, and fly ash or gold tailings, and then performing granulation, screening and shaping to obtain the solid waste-based lightweight aggregate. A method for preparing the solid waste-based artificial sand is as follows: mixing and stirring a low-carbon sulfur-aluminum-ferric cementitious material with phosphogypsum or desulfurized gypsum, and fly ash or gold tailings, and then performing granulation and screening to obtain the solid waste-based artificial sand. The present invention does not impose any special restrictions on the specific granulation, screening and shaping methods, and those skilled in the art can adjust the parameters according to the required particle size.

In the present invention, the solid waste-based lightweight aggregate and the solid waste-based artificial sand are more preferably prepared from the following components in percentage by mass: 10-20% of a low-carbon sulfur-aluminum-ferric cementitious material and 80-90% of phosphogypsum.

In the present invention, the mineral admixture is selected from one or both of fly ash and slag powder, where the quality grade of the fly ash shall not be lower than that of Grade II fly ash, and the quality of the slag powder shall meet the relevant regulations for at least S95 grade. The mineral admixture can be used to replace part of the cementitious material.

In the present invention, the auxiliary material is selected from one or more of carbide slag, red mud or slaked lime, and the auxiliary material has a pH≥11. The function of the auxiliary material is to activate the cementitious property of the mineral admixture.

In the present invention, the water reducer is a polycarboxylic acid-based high-performance water reducer with a water-reducing rate of over 25%.

In the present invention, the retarder is selected from boric acid or citric acid. The addition of the retarder can extend the hydration time of cement, facilitating pouring and construction.

The present invention further provides a method for preparing the above lightweight aggregate-based non-steam-cured high-performance pipe culvert, including steps of:

pre-wetting a solid waste-based lightweight aggregate and solid waste-based artificial sand by adding water separately to make the solid waste-based lightweight aggregate and the solid waste-based artificial sand reach a saturated surface dry state;

mixing a low-carbon sulfur-aluminum-ferric cementitious material, a mineral admixture and an auxiliary material uniformly by stirring, then adding the solid waste-based lightweight aggregate and the solid waste-based artificial sand in the saturated surface dry state, water, a retarder and a water reducer, where in this step, an amount of water added is a designed amount minus the amount of water used for pre-wetting by adding water in the previous step. The method further includes stirring, then pouring into a pipe culvert forming mold system for pipe culvert forming, vibrating mechanically for 5-15 minutes, allowing to stand naturally, demolding within 4 hours (after compressive strength reaches 25 M Pa), spraying with water, and then covering with a plastic film and curing for 1-3 days.

The pipe culvert forming mold system of the present invention consists of a feeding hopper and a forming mold, where the feeding hopper is designed in a conical shape with a cone angle greater than 60 degrees; and an inner wall of the forming mold is lined with a PVC film to facilitate demolding of the pipe culvert. The dimensions of the mold are determined according to specific requirements.

The present invention does not impose special restrictions on the stirring process, and the mixing parameters commonly used in the art can be adopted.

By adopting the preparation method of the present invention, demolding can be completed within 4 h, with short demolding time and fast mold turnover. Meanwhile, there is no need for steam curing after demolding, which saves energy and reduces the production cost.

The lightweight aggregate-based non-steam-cured high-performance pipe culvert prepared by the preparation method of the present invention has a cracking load of 75-150 kN/m, a failure load of 110-220 kN/m, and an internal water pressure of over 0.10 M Pa, meeting the standards of Grade III reinforced concrete pipes in GB/T 11836-2023.

The technical solutions of the present invention will be further elaborated below in combination with specific examples.

In the following examples, the low-carbon sulfur-aluminum-ferric cementitious material met the standard of T/CCPA 42-2023.

The solid waste-based artificial sand was prepared from 82 wt % of phosphogypsum and 18 wt % of low-carbon sulfur-aluminum-ferric cementitious material. The specific preparation method was as follows: adding phosphogypsum and the low-carbon sulfur-aluminum-ferric cementitious material into a vertical mixer and stirring for 5 minutes to make a mixed powder; then adding the mixed powder into a disk granulator with an inclination angle of 45°, with the disk granulator rotating at a speed of 30 Hz, and spraying water and adding the powder simultaneously, so that the powder turns into masterbatch particles; continuing rotating the disk granulator, adding the powder and spraying water for granulation until some of the particles are larger than 2.5 mm, then feeding the materials into a screening machine equipped with a nested sieve for screening, and returning the particles smaller than 0.15 mm to the disk granulator for continuous granulation; and sending the screened finished solid waste-based artificial sand with a particle size of 0.15-4.75 mm to a material bin. After measurement, the solid waste-based artificial sand had a bulk density of 1100 kg/m$^3$, a fineness modulus of 2.4-3.0, and a cylinder compressive strength greater than 6 M Pa.

The solid waste-based lightweight aggregate was prepared from 83 wt % phosphogypsum and 17 wt % low-carbon sulfur-aluminum-ferric cementitious material. The specific preparation method was as follows: adding phosphogypsum and the low-carbon sulfur-aluminum-ferric cementitious material into a vertical mixer and stirring for 5 minutes to make a mixed powder; then adding the mixed powder into a disk granulator with an inclination angle of 45°, with the disk granulator rotating at a speed of 30 Hz, and spraying water and adding the powder simultaneously, so that the powder turns into masterbatch particles; continuing adding the powder and spraying water for granulation until some of the particles are larger than 10 mm, and then feeding the materials into a screening machine equipped with a nested sieve for screening; returning the particles smaller than 5 mm to the disk granulator for continuous granulation; rotating and shaping the screened particles with particle sizes of 5-10 mm and 10-20 mm respectively in a disk shaping machine with an inclination angle of 50° to achieve sphericity, with shaping time of 5 minutes and 3 minutes respectively until the strength meets the requirements; and sending the finished solid waste-based lightweight aggregate to a material bin. After measurement, the obtained solid waste-based lightweight aggregate had a bulk density of less than 1080 kg/m$^3$, an apparent density of 1680 kg/m$^3$, a cylinder compressive strength greater than 8 MPa, and a softening coefficient of 0.83.

The pipe culvert forming mold system in the following examples consisted of a feeding hopper and a forming mold, where the feeding hopper was designed in a conical shape with a cone angle greater than 60 degrees; and an inner wall of the forming mold was lined with a PVC film.

Example 1

This example provides a lightweight aggregate-based non-steam-cured high-performance pipe culvert and a preparation method thereof.

The lightweight aggregate-based non-steam-cured high-performance pipe culvert in this example was prepared from a raw material including the following components by mass per unit volume of lightweight aggregate concrete: the solid waste-based lightweight aggregate used in an amount of 850 kg/m$^3$ (particles with a particle size of 5-10 mm used in an amount of 255 kg/m$^3$, and particles with a particle size of 10-20 mm used in an amount of 595 kg/m$^3$); the solid waste-based artificial sand used in an amount of 500 kg/m$^3$, the low-carbon sulfur-aluminum-ferric cementitious material used in an amount of 450 kg/m$^3$, and water used in a total amount of 130 kg/m$^3$; a retarder (boric acid) in an addition amount of 0.9 kg/m$^3$; and a polycarboxylic acid-based high-performance water reducer in an addition amount of 20.25 kg/m$^3$.

The preparation method was as follows:
Step 1: pre-wetting the solid waste-based lightweight aggregate and the solid waste-based artificial sand by adding water separately, and soaking for 1 hour to make them reach a saturated surface dry state.
Step 2: adding the solid waste-based lightweight aggregate and the solid waste-based artificial sand in the saturated surface dry state to the low-carbon sulfur-aluminum-ferric cementitious material, then adding the remaining water, the retarder and the polycarboxylic acid-based high-performance water reducer, and stirring for 1.5 minutes to obtain lightweight aggregate concrete.
Step 3: pouring the lightweight aggregate concrete prepared in Step 2 into the pipe culvert forming mold system, vibrating the mold mechanically for 10 minutes, and allowing the concrete to stand at room temperature (25±3° C.).
Step 4: after 3 hours, since the strength of the pipe culvert was greater than 25 MPa, demolding the pipe culvert, where the prepared pipe culvert had an inner diameter of 1500 mm, a wall thickness of 150 mm, and a length of 2000 mm.
Step 5: curing of the pipe culvert: spraying water at room temperature (25±3° C.), covering with a plastic film and curing for 2 days.

Example 2

This example provides a lightweight aggregate-based non-steam-cured high-performance pipe culvert and a preparation method thereof.

The non-steam-cured high-performance pipe culvert in this example was prepared from a raw material including the following components by mass per unit volume of lightweight aggregate concrete: the solid waste-based lightweight aggregate used in an amount of 870 kg/m$^3$ (particles with a particle size of 5-10 mm used in an amount of 255 kg/m$^3$, and particles with a particle size of 10-20 mm used in an amount of 615 kg/m$^3$); the solid waste-based artificial sand used in an amount of 480 kg/m$^3$, the low-carbon sulfur-aluminum-ferric cementitious material used in an amount of 400 kg/m$^3$, carbide slag used in an amount of 18 kg/m$^3$, slag powder used in an amount of 32 kg/m$^3$, and water used in a total amount of 122 kg/m$^3$; a retarder (boric acid) in an addition amount of 0.8 kg/m$^3$; and a polycarboxylic acid-based high-performance water reducer in an addition amount of 18 kg/m$^3$.

The preparation method was as follows:
Step 1: pre-wetting the solid waste-based lightweight aggregate and the solid waste-based artificial sand by adding water separately, and soaking for 1 hour to make them reach a saturated surface dry state.
Step 2: mixing the low-carbon sulfur-aluminum-ferric cementitious material, the carbide slag and the slag powder for 0.5 minutes, then adding the solid waste-based lightweight aggregate and the solid waste-based artificial sand in the saturated surface dry state, then adding the remaining water, the retarder and the polycarboxylic acid-based high-performance water reducer, and stirring for 1.5 minutes to obtain lightweight aggregate concrete.
Step 3: pouring the lightweight aggregate concrete in Step 2 into the pipe culvert forming mold system, vibrating the mold mechanically for 15 minutes, and allowing the concrete to stand at room temperature (25±3° C.).
Step 4: after 3.3 hours, since the strength of the pipe culvert was greater than 25 MPa, demolding the pipe culvert, where the prepared pipe culvert had an inner diameter of 1200 mm, a wall thickness of 120 mm, and a length of 2000 mm.
Step 5: curing of the pipe culvert: spraying water at room temperature (25±3° C.), covering with a plastic film and curing for 2 days.

Example 3

This example provides a lightweight aggregate-based non-steam-cured high-performance pipe culvert and a preparation method thereof.

The non-steam-cured high-performance pipe culvert in this example was prepared from a raw material including the following components by mass per unit volume of lightweight aggregate concrete: the solid waste-based lightweight aggregate used in an amount of 920 kg/m$^3$ (particles with a particle size of 5-10 mm used in an amount of 255 kg/m$^3$, and particles with a particle size of 10-20 mm used in an amount of 615 kg/m$^3$); the solid waste-based artificial sand used in an amount of 400 kg/m$^3$, the low-carbon sulfur-aluminum-ferric cementitious material used in an amount of 450 kg/m$^3$, and water used in a total amount of 148 kg/m$^3$; a retarder (boric acid) in an addition amount of 0.9 kg/m$^3$; and a polycarboxylic acid-based high-performance water reducer in an addition amount of 20.25 kg/m$^3$.

The preparation method was as follows:
Step 1: pre-wetting the solid waste-based lightweight aggregate and the solid waste-based artificial sand by adding water separately, soaking for 1 hour, and then making them reach a saturated surface dry state.
Step 2: adding the solid waste-based lightweight aggregate and the solid waste-based artificial sand in the saturated surface dry state to the low-carbon sulfuraluminum-ferric cementitious material, then adding the remaining water, the retarder and the polycarboxylic acid-based high-performance water reducer, and stirring for 1.5 minutes to obtain lightweight aggregate concrete.

Step 3: pouring the lightweight aggregate concrete in Step 2 into the pipe culvert forming mold system, vibrating mechanically for 10 minutes, and allowing the concrete to stand at room temperature (25±3° C.).

Step 4: after 3.5 hours, since the strength of the pipe culvert was greater than 25 M Pa, demolding the pipe culvert, where the prepared pipe culvert had an inner diameter of 800 mm, a wall thickness of 80 mm, and a length of 1500 mm.

Step 5: curing of the pipe culvert: spraying water at room temperature (25±3° C.), covering with a plastic film and curing for 3 days.

Comparative Example 1

This comparative example provides a method for preparing an ordinary Portland cement-based pipe culvert.

The ordinary Portland cement-based pipe culvert in this comparative example was prepared from a raw material including the following components by mass per unit concrete volume: crushed stones (GB 175-2023) used in an amount of 1175 kg/m$^3$; and manufactured sand (GB 175-2023) used in an amount of 720 kg/m$^3$, P.O. 42.5 ordinary Portland cement (GB 175-2023) used in an amount of 400 kg/m$^3$, water used in a total amount of 138 kg/m$^3$, and a polycarboxylic acid-based high-performance water reducer used in an amount of 18 kg/m$^3$.

The preparation method was as follows:

Step 1: pouring the Portland cement, the crushed stones and the manufactured sand into a mixer, stirring for 0.5 minutes, then adding water and the polycarboxylic acid-based high-performance water reducer, and stirring for 1.5 minutes to obtain ordinary concrete.

Step 2: pouring the ordinary concrete prepared in Step 1 into the pipe culvert forming mold system, vibrating mechanically for 18 minutes, and allowing the concrete to stand at room temperature (25±3° C.).

Step 3: after 24 hours, since the strength of the pipe culvert was greater than 31 M Pa, demolding the pipe culvert, where the prepared pipe culvert had an inner diameter of 1200 mm, a wall thickness of 120 mm, and a length of 2000 mm.

Step 4: curing of the pipe culvert: performing steam curing for 1 day, and then performing natural curing for 26 days.

Comparative Example 2

This comparative example provides a method for preparing an ordinary Portland cement-based pipe culvert.

The ordinary Portland cement-based pipe culvert in this comparative example was prepared from a raw material including the following components by mass per concrete unit volume: crushed stones used in an amount of 1195 kg/m$^3$; and manufactured sand used in an amount of 700 kg/m$^3$, ordinary Portland cement used in an amount of 400 kg/m$^3$, water used in a total amount of 130 kg/m$^3$, and a polycarboxylic acid-based high-performance water reducer used in an amount of 18 kg/m$^3$.

The preparation method was as follows:

Step 1: pouring the Portland cement, the crushed stones and the manufactured sand into a mixer, stirring for 0.5 minutes, then adding water and the polycarboxylic acid-based high-performance water reducer, and stirring for 1.5 minutes to obtain ordinary concrete.

Step 2: pouring the ordinary concrete prepared in Step 1 into the pipe culvert forming mold system, vibrating mechanically for 18 minutes, and allowing the concrete to stand at room temperature (25±3° C.).

Step 3: after 24 hours, since the strength of the pipe culvert was greater than 31 M Pa, demolding the pipe culvert, where the prepared pipe culvert had an inner diameter of 1200 mm, a wall thickness of 120 mm, and a length of 2000 mm.

Step 4: curing of the pipe culvert: performing steam curing for 1 day, and then performing natural curing for 26 days.

Test Examples

The performance data of the lightweight aggregate concrete in Examples 1-3 and the ordinary concrete in Comparative Examples 1-2 are shown in Table 1.

Table 1 Performance data of the concrete in Examples 1-3 and Comparative Examples 1-2

| Number | Slump (mm) | Flow spread (mm) |
|---|---|---|
| Example 1 | 220 | 425 |
| Example 2 | 215 | 440 |
| Example 3 | 233 | 460 |
| Comparative Example 1 | 100 | 100 |
| Comparative Example 2 | 90 | 90 |

From the data in Table 1, it could be seen that the fluidity and slump indexes of the lightweight aggregate concrete in Examples 1-3 were superior to those of the ordinary concrete in Comparative Examples 1-2, indicating that the lightweight aggregate concrete had better construction performance.

The performance data of the pipe culverts in Examples 1-3 and Comparative Examples 1-2 are shown in Table 2.

Table 2 Performance data of the pipe culverts in Examples 1-3 and Comparative Examples 1-2

| Number | Compressive strength (M Pa) | | Cracking load (kN/m) | Failure load (kN · m) | Internal water pressure (M Pa) |
|---|---|---|---|---|---|
| | At demolding | 28 d | | | |
| Example 1 | 33.8 (3 h) | 51.4 | 148 | 212 | >0.1 |
| Example 2 | 32.5 (3.3 h) | 47.5 | 118 | 166 | >0.1 |
| Example 3 | 30.2 (3.5 h) | 45.5 | 102 | 147 | >0.1 |
| Comparative Example 1 | 31.0 (24 h) | 45.2 | 99 | 150 | >0.1 |
| Comparative Example 2 | 32.5 (24 h) | 46.3 | 105 | 147 | >0.1 |

From the data in Table 2, it could be seen that the pipe culverts in Examples 1-3 could reach a compressive strength of over 30 M Pa within 4 h. The ordinary Portland cement-based pipe culverts needed steam curing after demolding, and the hardening process of the Portland cement-based concrete was accelerated through steam heating. However, the lightweight aggregate concrete pipe culverts in Examples 1-3 of the present invention did not need steam curing after demolding. All parameters met the use requirements, and Examples 1-3 all met the standards of Grade III reinforced concrete pipes in GB/T 11836-2023. In addition, it was determined that the pipe culverts in Examples 1-3 of the present invention withstood more than 50 sulfate dry-wet cycles, and they had good anti-erosion performance and durability.

The above are only the preferred examples of the present invention and are not intended to limit the present invention. For those skilled in the art, the present invention may have various modifications and changes. Any modifications, equivalent substitutions, improvements, etc. made within the spirit and principles of the present invention shall be included in the scope of protection of the present invention.

The invention claimed is:

1. A lightweight aggregate-based non-steam-cured pipe culvert, wherein the lightweight aggregate-based non-steam-cured pipe culvert is prepared from a raw material comprising the following components by mass per unit volume:
   300-450 kg/m$^3$ of a sulfur-aluminum-ferric cementitious material;
   800-920 kg/m$^3$ of a solid waste-based lightweight aggregate;
   300-550 kg/m$^3$ of a solid waste-based artificial sand;
   0-100 kg/m$^3$ of a mineral admixture;
   0-50 kg/m$^3$ of an auxiliary material; and
   110-160 kg/m$^3$ of water; and
   the raw material further comprises a water reducer and a retarder, the water reducer being added in an amount of 1.5-5 wt % of the sulfur-aluminum-ferric cementitious material, and the retarder being added in an amount of 0.1-0.5 wt % of the sulfur-aluminum-ferric cementitious material;
   the solid waste-based lightweight aggregate comprises the following components in percentage by mass: 10-20% of the sulfur-aluminum-ferric cementitious material, 0-90% of phosphogypsum or desulfurized gypsum, and 0-90% of fly ash or gold tailings, and the solid waste-based lightweight aggregate has a particle size of 5-20 mm;
   the solid waste-based artificial sand comprises the following components in percentage by mass: 10-20% of the sulfur-aluminum-ferric cementitious material, 0-90% of phosphogypsum or desulfurized gypsum, and 0-90% of fly ash or gold tailings, and the solid waste-based artificial sand has a particle size of 0.15-4.75 mm.

2. The lightweight aggregate-based non-steam-cured pipe culvert according to claim 1, wherein in the sulfur-aluminum-ferric cementitious material, CaO≥37%, —Al$_2$O$_3$—≥20%, —Fe$_2$O$_3$≥6%, and SO$_3$≥8%.

3. The lightweight aggregate-based non-steam-cured pipe culvert according to claim 1, wherein the solid waste-based lightweight aggregate has a bulk density of less than 1200 kg/m$^3$, an apparent density of 1600-1800 kg/m$^3$, a cylinder compressive strength of greater than 6 MPa, and a softening coefficient of greater than 0.82.

4. The lightweight aggregate-based non-steam-cured pipe culvert according to claim 1, wherein in the solid waste-based lightweight aggregate, a mass per unit volume of the solid waste-based lightweight aggregate with a particle size of 5-10 mm is 240-280 kg/m$^3$, and a mass per unit volume of the solid waste-based lightweight aggregate with a particle size of 10-20 mm is 560-640 kg/m$^3$.

5. The lightweight aggregate-based non-steam-cured pipe culvert according to claim 1, wherein the solid waste-based artificial sand has a bulk density of less than 1200 kg/m$^3$, a fineness modulus of 2.4-3.0, and a cylinder compressive strength of greater than 6 MPa.

6. The lightweight aggregate-based non-steam-cured pipe culvert according to claim 1, wherein the mineral admixture is selected from one or both of fly ash and slag powder; and the auxiliary material is selected from one or more of carbide slag, red mud or slaked lime, and the auxiliary material has a pH≥11.

7. The lightweight aggregate-based non-steam-cured pipe culvert according to claim 1, wherein the water reducer is a polycarboxylic acid-based water reducer with a water-reducing rate of over 25%.

8. The lightweight aggregate-based non-steam-cured pipe culvert according to claim 1, wherein the retarder is selected from boric acid or citric acid.

9. A method for preparing the lightweight aggregate-based non-steam-cured pipe culvert according to claim 1, comprising:
   pre-wetting a solid waste-based lightweight aggregate and a solid waste-based artificial sand by adding water separately to obtain a saturated surface dry solid waste-based lightweight aggregate and a saturated surface dry solid waste-based artificial sand; and
   mixing a sulfur-aluminum-ferric cementitious material, a mineral admixture and an auxiliary material uniformly by stirring, then adding the saturated surface dry solid waste-based lightweight aggregate and the saturated surface dry solid waste-based artificial sand, water, a retarder and a water reducer, stirring, then pouring into a pipe culvert forming mold system for pipe culvert forming, allowing to stand naturally, demolding within 4 hours, spraying with water, and then covering with a plastic film and curing for 1-3 days.

10. A method for preparing the lightweight aggregate-based non-steam-cured pipe culvert according to claim 2, comprising:
    pre-wetting a solid waste-based lightweight aggregate and a solid waste-based artificial sand by adding water separately to obtain a saturated surface dry solid waste-based lightweight aggregate and a saturated surface dry solid waste-based artificial sand;
    mixing a sulfur-aluminum-ferric cementitious material, a mineral admixture and an auxiliary material uniformly by stirring, then adding the saturated surface dry solid waste-based lightweight aggregate and the saturated surface dry solid waste-based artificial sand, water, a retarder and a water reducer, stirring, then pouring into a pipe culvert forming mold system for pipe culvert forming, allowing to stand naturally, demolding within 4 hours, spraying with water, and then covering with a plastic film and curing for 1-3 days.

11. A method for preparing the lightweight aggregate-based non-steam-cured pipe culvert according to claim 3, comprising:
    pre-wetting a solid waste-based lightweight aggregate and a solid waste-based artificial sand by adding water separately to obtain a saturated surface dry solid waste-based lightweight aggregate and a saturated surface dry solid waste-based artificial sand;
    mixing a sulfur-aluminum-ferric cementitious material, a mineral admixture and an auxiliary material uniformly by stirring, then adding the saturated surface dry solid waste-based lightweight aggregate and the saturated surface dry solid waste-based artificial sand, water, a retarder and a water reducer, stirring, then pouring into a pipe culvert forming mold system for pipe culvert forming, allowing to stand naturally, demolding within 4 hours, spraying with water, and then covering with a plastic film and curing for 1-3 days.

12. A method for preparing the lightweight aggregate-based non-steam-cured pipe culvert according to claim 4, comprising:
   pre-wetting a solid waste-based lightweight aggregate and a solid waste-based artificial sand by adding water separately to obtain a saturated surface dry solid waste-based lightweight aggregate and a saturated surface dry solid waste-based artificial sand; and
   mixing a sulfur-aluminum-ferric cementitious material, a mineral admixture and an auxiliary material uniformly by stirring, then adding the saturated surface dry solid waste-based lightweight aggregate and the saturated surface dry solid waste-based artificial sand, water, a retarder and a water reducer, stirring, then pouring into a pipe culvert forming mold system for pipe culvert forming, allowing to stand naturally, demolding within 4 hours, spraying with water, and then covering with a plastic film and curing for 1-3 days.

13. A method for preparing the lightweight aggregate-based non-steam-cured pipe culvert according to claim 5, comprising:
   pre-wetting a solid waste-based lightweight aggregate and a solid waste-based artificial sand by adding water separately to obtain a saturated surface dry solid waste-based lightweight aggregate and a saturated surface dry solid waste-based artificial sand;
   mixing a sulfur-aluminum-ferric cementitious material, a mineral admixture and an auxiliary material uniformly by stirring, then adding the saturated surface dry solid waste-based lightweight aggregate and the saturated surface dry solid waste-based artificial sand, water, a retarder and a water reducer, stirring, then pouring into a pipe culvert forming mold system for pipe culvert forming, allowing to stand naturally, demolding within 4 hours, spraying with water, and then covering with a plastic film and curing for 1-3 days.

14. A method for preparing the lightweight aggregate-based non-steam-cured pipe culvert according to claim 6, comprising:
   pre-wetting a solid waste-based lightweight aggregate and a solid waste-based artificial sand by adding water separately to obtain a saturated surface dry solid waste-based lightweight aggregate and a saturated surface dry solid waste-based artificial sand;
   mixing a sulfur-aluminum-ferric cementitious material, a mineral admixture and an auxiliary material uniformly by stirring, then adding the saturated surface dry solid waste-based lightweight aggregate and the saturated surface dry solid waste-based artificial sand, water, a retarder and a water reducer, stirring, then pouring into a pipe culvert forming mold system for pipe culvert forming, allowing to stand naturally, demolding within 4 hours, spraying with water, and then covering with a plastic film and curing for 1-3 days.

15. A method for preparing the lightweight aggregate-based non-steam-cured pipe culvert according to claim 7, comprising:
   pre-wetting a solid waste-based lightweight aggregate and a solid waste-based artificial sand by adding water separately to obtain a saturated surface dry solid waste-based lightweight aggregate and a saturated surface dry solid waste-based artificial sand; and
   mixing a sulfur-aluminum-ferric cementitious material, a mineral admixture and an auxiliary material uniformly by stirring, then adding the saturated surface dry solid waste-based lightweight aggregate and the saturated surface dry solid waste-based artificial sand, water, a retarder and a water reducer, stirring, then pouring into a pipe culvert forming mold system for pipe culvert forming, allowing to stand naturally, demolding within 4 hours, spraying with water, and then covering with a plastic film and curing for 1-3 days.

16. A method for preparing the lightweight aggregate-based non-steam-cured pipe culvert according to claim 8, comprising:
   pre-wetting a solid waste-based lightweight aggregate and a solid waste-based artificial sand by adding water separately to obtain a saturated surface dry solid waste-based lightweight aggregate and a saturated surface dry solid waste-based artificial sand; and
   mixing a sulfur-aluminum-ferric cementitious material, a mineral admixture and an auxiliary material uniformly by stirring, then adding the saturated surface dry solid waste-based lightweight aggregate and the saturated surface dry solid waste-based artificial sand, water, a retarder and a water reducer, stirring, then pouring into a pipe culvert forming mold system for pipe culvert forming, allowing to stand naturally, demolding within 4 hours, spraying with water, and then covering with a plastic film and curing for 1-3 days.

17. The method according to claim 9, wherein the pipe culvert forming mold system consists of a feeding hopper and a forming mold, wherein the feeding hopper is designed in a conical shape with a cone angle greater than 60 degrees; and an inner wall of the forming mold is lined with a PVC film.

* * * * *